(12) United States Patent
Matsuzawa

(10) Patent No.: US 8,264,724 B2
(45) Date of Patent: Sep. 11, 2012

(54) JOB HISTORY INFORMATION AUDITING SYSTEM, IMAGE FORMING APPARATUS, CONTROL METHOD, AND COMPUTER-READABLE MEDIUM

(75) Inventor: Noriko Matsuzawa, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 12/837,348

(22) Filed: Jul. 15, 2010

(65) Prior Publication Data

US 2011/0032563 A1    Feb. 10, 2011

(30) Foreign Application Priority Data

Aug. 4, 2009    (JP) ................... 2009-181968

(51) Int. Cl.
*G06F 15/00* (2006.01)
*G06F 15/173* (2006.01)
(52) U.S. Cl. .................... 358/1.15; 709/223
(58) Field of Classification Search ........... 358/1.15; 709/223
See application file for complete search history.

(56) References Cited

U.S. PATENT DOCUMENTS

| | | |
|---|---|---|
| 2006/0268332 A1 | 11/2006 | Shimada |
| 2007/0121151 A1 | 5/2007 | Uchida |
| 2008/0055633 A1* | 3/2008 | Kajiyama et al. ............ 358/1.15 |
| 2010/0202016 A1 | 8/2010 | Matsuzawa |

FOREIGN PATENT DOCUMENTS

| | | |
|---|---|---|
| JP | 2006-330939 | 12/2006 |
| JP | 2007-148830 | 6/2007 |

OTHER PUBLICATIONS

U.S. Appl. No. 12/748,837, filed Mar. 29, 2010, Noriko Matsuzawa.

\* cited by examiner

*Primary Examiner* — Saeid Ebrahimi Dehkordy
(74) *Attorney, Agent, or Firm* — Fitzpatrick, Cella, Harper & Scinto

(57) ABSTRACT

A job history information auditing system includes an image forming apparatus which generates job history information including a log and image data or a link log upon execution of a job, and a data server which saves the job history information in a searchable state.

9 Claims, 15 Drawing Sheets

F I G. 5

| JOB TYPE | JOB CLASSIFICATION | TYPE OF IMAGE DATA | WHETHER OR NOT TO RECORD JOB HISTORY INFORMATION | INPUT JOB THAT CAN BE REFERENCE DESTINATION INFORMATION OF OUTPUT JOB |
|---|---|---|---|---|
| COPY JOB | INPUT JOB | IMAGE DATA | RECORD | — |
| PDL-PRINT JOB | INPUT JOB | IMAGE DATA | NOT RECORD | — |
| SCAN JOB/ BOX STORAGE JOB | INPUT JOB | IMAGE DATA | RECORD | — |
| RECEIVING JOB (FAX/I-FAX) | INPUT JOB | IMAGE DATA | RECORD | — |
| SENDING JOB (FAX/I-FAX/SEND) | OUTPUT JOB | REFERENCE INFORMATION | RECORD | SCAN JOB/ BOX STORAGE JOB/ RECEIVING JOB (FAX/I-FAX) |
| BOX-PRINT JOB, RECEIVING PRINT JOB | OUTPUT JOB | REFERENCE INFORMATION | RECORD | SCAN JOB/ BOX STORAGE JOB/ RECEIVING JOB (FAX/I-FAX) |

FIG. 7

```xml
<?xml version="1.0" encoding="UTF-16"?>
<!-- sample -->
<logInformation xmlns:xlink="http://www.w3.org/1999/xlink">    ← 701
    <deviceInformation>    ← 702
        <deviceName>My Device</deviceName>
        </productName>Xxxxx iR6800</productName>
        <serialNumber>abc00001</serialNumber>
        <location>35F</location>
    </deviceInformation>
    <userInformation>    ← 703
        <departmentID>12345</departmentID>
        <userName>shimizu</userName>
        <domainName>domain1</domainName>
    </userInformation>
    <jobInformation>    ← 704
        <documentID>00000003</documentID>    ← 705
        <documentFlag>no</documentFlag>
        <jobType>fax-send</jobType>
        <jobName>My Document</jobName>
        <pageNum>2</pageNum>
        <copies>2</copies>
        <startADateTime>2009/04/01 13:44:58</startADateTime>
        <endADateTime>2009/04/01 13:45:14</endADateTime>
        <result>ok</result>
    </jobInformation>
</logInformation>
```

LOG

| LOG ID | DOCUMENT ID | JOB TYPE | JOB START TIME | ... |
|---|---|---|---|---|
| 00001 | aaaaa | BOX STORAGE JOB | 2009/4/1 14:08 | ... |
| 00002 | bbbbb | COPY | 2009/4/10 17:11 | ... |
| | | | | |

IMAGE DATA

| DOCUMENT ID | IMAGE DATA | ... |
|---|---|---|
| aaaaa | ... | ... |
| bbbbb | ... | ... |
| | | |

FIG. 8B

LOG

| LOG ID | DOCUMENT ID | JOB TYPE | JOB START TIME | ... |
|---|---|---|---|---|
| 00001 | aaaaa | BOX STORAGE JOB | 2009/4/1 14:08 | ... |
| 00002 | bbbbb | COPY | 2009/4/10 17:11 | ... |
| 00003 | aaaaa | BOX-PRINT JOB | 2009/4/20 17:13 | ... |
| | | | | |

IMAGE DATA

| DOCUMENT ID | SAVING PERIOD | IMAGE DATA | ... |
|---|---|---|---|
| aaaaa | 2009/5/20 | ... | ... |
| bbbbb | 2009/5/1 | ... | ... |
| | | | |

FIG. 8C

| DAY OF WEEK OF RECORDING JOB HISTORY INFORMATION | RECORD IN FULL TIME | TIME PERIOD 1 | TIME PERIOD 2 | ... |
|---|---|---|---|---|
| MONDAY | No | 8:30~12:00 | 13:00~17:00 | ... |
| TUESDAY | No | 8:30~12:00 | 13:00~17:00 | ... |
| WEDNESDAY | No | 8:30~12:00 | 13:00~17:00 | ... |
| THURSDAY | No | 8:30~12:00 | 13:00~17:00 | ... |
| FRIDAY | No | 8:30~12:00 | 13:00~17:00 | ... |
| SATURDAY | Yes | - | - | ... |
| SUNDAY | Yes | - | - | ... |

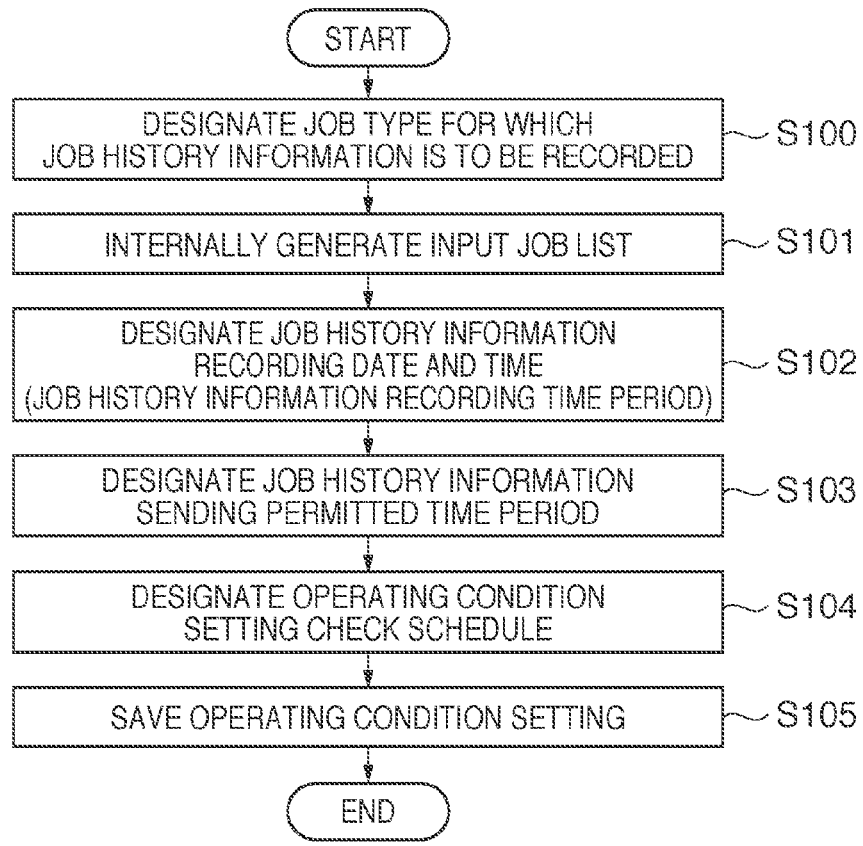
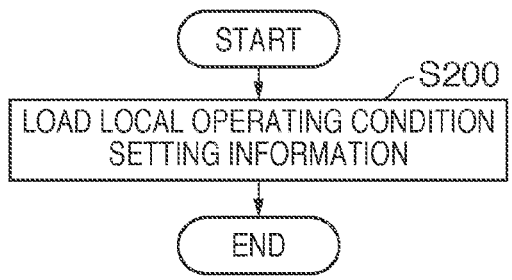
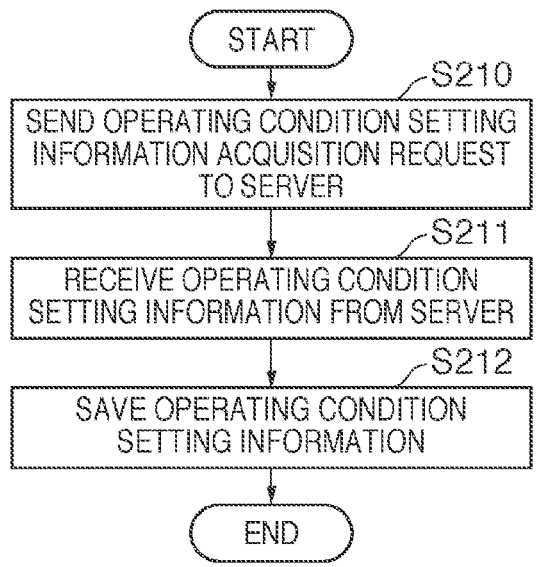

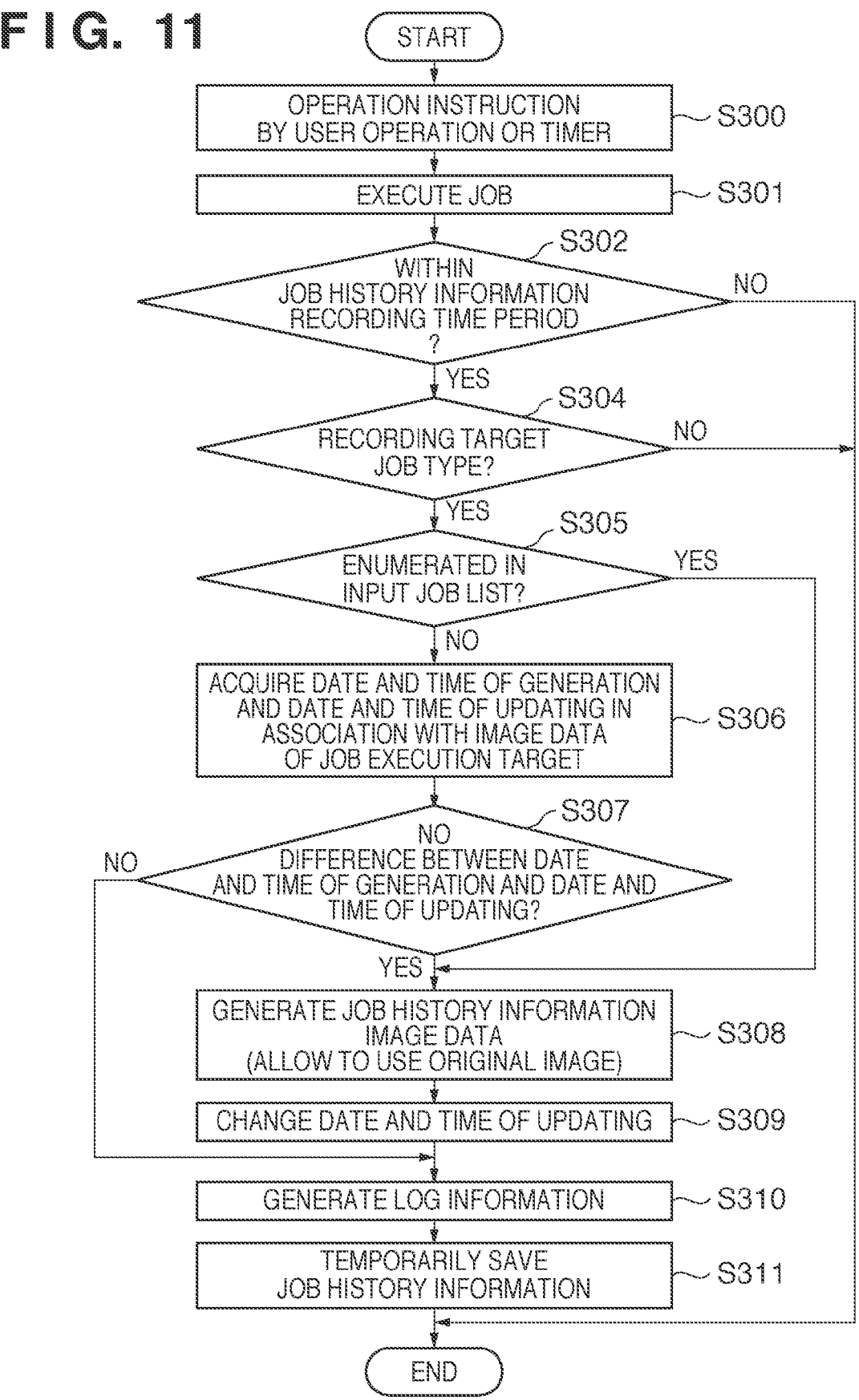

| TYPE OF JOB TO STORE | ☑ COPY<br>☑ PRINT<br>☑ FAX SENDING<br>☑ FAX RECEIVING<br>☑ BOX<br>☑ SCAN/SENDING |
|---|---|

| DAY OF WEEK AND TIME PERIOD TO STORE<br><br>1702 | MONDAY: ◉ FULL TIME ○ DESIGNATED TIME PERIOD<br>TUESDAY: ◉ FULL TIME ○ DESIGNATED TIME PERIOD<br>WEDNESDAY: ◉ FULL TIME ○ DESIGNATED TIME PERIOD<br>THURSDAY: ◉ FULL TIME ○ DESIGNATED TIME PERIOD<br>FRIDAY: ◉ FULL TIME ○ DESIGNATED TIME PERIOD<br>SATURDAY: ◉ FULL TIME ○ DESIGNATED TIME PERIOD<br>SUNDAY: ◉ FULL TIME ○ DESIGNATED TIME PERIOD |

1703

TIME PERIOD DESIGNATION  ☐:☐ ~ ☐:☐
                         ☐:☐ ~ ☐:☐

JOB SENDING SCHEDULE ~1704
  ◉ SENDING INTERVAL    ☐ MINUTES
  ○ SENDING START TIME  ☐:☐

OPERATING CONDITION CHECK SCHEDULE ~1705
  ◉ SENDING INTERVAL    ☐ MINUTES
  ○ SENDING START TIME  ☐:☐

JOB EXECUTION IN JOB HISTORY INFORMATION ~1706
RECORDING STOP TIME PERIOD
  ○ PROHIBIT
  ◉ NOT PROHIBIT

JOB HISTORY INFORMATION AUDITING SYSTEM, IMAGE FORMING APPARATUS, CONTROL METHOD, AND COMPUTER-READABLE MEDIUM

BACKGROUND OF THE INVENTION

1. Field of the Invention

The present invention relates to a job history information auditing system, which can record job history information including an execution user and a date and time of execution in association with a scan job, copy job, print job, and the like executed in an image forming apparatus.

2. Description of the Related Art

Along with the recent popularization of printers and digital MFPs (Multi-Function Peripherals), print, copy, and sending operations of originals can now be easily executed. However, although user convenience is enhanced, information leakage resulting from the print, copy, and sending operations of originals pose a problem. As a measure against this problem, a digital MFP, which saves job history information in a storage device upon execution of a print job, copy job, FAX job, and e-mail sending job, is available.

A job history information auditing system includes the digital MFP and a server. A database is built on the server. Job history information recorded in the digital MFP is sent to the server, and is saved in the database. Pieces of job history information for a predetermined period are saved on the database in a searchable state. For example, when information leakage has been uncovered, the pieces of job history information corresponding to the information leakage can be traced back. Such digital MFP and job history information auditing system require large-capacity storage areas to save a large number of pieces of job history information. For this reason, a method of reducing the required storage capacity and efficiently saving more job histories has been proposed.

For example, in Japanese Patent Laid-Open No. 2006-330939, when identical image data is to be input/output to/from an image processing apparatus, reference information to the image data already saved in the database is saved in place of the full image data. In this way, the storage capacity required for the database is reduced. More specifically, the image processing apparatus records image data at the time of execution of an input job, and records reference information to the image data at the time of execution of an output job that uses the already input image data. This mechanism will be referred to as a link log hereinafter.

The method of Japanese Patent Laid-Open No. 2006-330939 will be described in more detail below. The digital MFP has an area for saving document data in the apparatus to have, for example, a name "user BOX". Then, even when the user does not have data at hand, he or she can execute a print or e-mail sending job using the document data saved in the user BOX. In this case, an input job is a job that saves document data in the user BOX, and an output job is a job that uses the document data in the user BOX. Since the identical document data is processed by the input and output jobs, it is redundant to save image data in the database as job history information at the respective times of execution of the input and output jobs. For this reason, image data is saved in the database only at the time of execution of the input job, and only reference information to the image data saved in the database is saved at the time of execution of the output job. In this way, the data size saved in the database can be reduced.

Japanese Patent Laid-Open No. 2007-148830 has proposed a printing system, which suppresses information leakages by traceably saving keywords, items of print job attributes, and the like that match extraction conditions associated with time information as job history information. In this system, extraction conditions of tracing information are set in advance in association with time periods. Tracing information that matches extraction conditions, which change depending on time periods, is extracted from print data according to a print execution time, and is saved. In this way, conditions required to record job history information in a normal service time period and those required to record job history information in a time period other than the normal service time period can be defined, thus allowing operations in consideration of, for example, a network load.

By combining the link log mechanism required to reduce the storage area and the job history information recording stop time period setting mechanism required to reduce the network load, respective problems can be solved.

However, when these two mechanisms are combined, image data may leak from the job history information in some cases. More specifically, when an input job is executed in a job history information recording stop time period, this job history information is not recorded. That is, image data is not saved in the server. However, using reusable image data saved in the digital MFP by the input job, an output job can be executed in a job history information recording time period. In this case, a link log including a link to image data, which is not saved in the server, is saved in the server as job history information. As a result, it is not possible to confirm image data to be reused upon auditing job history information. For this reason, a problem is posed for the job history information auditing system, which aims at enhancing security such as information leakage suppression.

SUMMARY OF THE INVENTION

The present invention prevents a reference destination of image data to be reused by a link log from being unable being confirmed by reusing a log of a job executed in a job history information recording stop time period, while realizing a reduction of the network load by the link log. Also, the present invention prevents log inconsistency. Furthermore, the present invention enhances the security required to prevent information leakages.

According to first aspect of the present invention, there is provided a job history information auditing system including an image forming apparatus which generates job history information including a log and image data or a link log upon execution of a job, and a data server which saves the job history information in a searchable state, the image forming apparatus comprises: a setting information acquisition unit configured to acquire an operating condition setting associated with execution of a job and generation of a log; a job determination unit configured to determine whether or not the executed job is an input job that has the log of the input job and image data related to the log referred to as a reference destination of the link log included in job history information of the output job which is executed after the input job has been executed, according to a type of the executed job; an appending unit configured to append, to the image data related to the log, information indicating whether or not job history information image data has already been generated; a generation determination unit configured to determine based on the information appended by the appending unit whether or not job history information image data has already been generated; an image data generation unit configured to generate the image data related to the log of the executed job as job history information image data; a log generation unit configured to generate a log or a link log of the executed job; and a sending unit configured to send the job history information including the log and the job history information image data related to the log or the link log to the data server according to the operating condition setting, the link log includes information as a reference destination of the image data when the job uses the job history information image data saved in the data server, and the image data generation unit generates the job history information image data when the job determination unit determines that the executed job is the input job, and the generation determination unit determines that the job history information image data has not been generated yet.

According to second aspect of the present invention, there is provided an image forming apparatus, which generates job history information including a log and image data or a link log upon execution of a job, and is connected to a data server, which saves the job history information in a searchable state, comprising: a setting information acquisition unit configured to acquire an operating condition setting associated with execution of a job and generation of a log; a job determination unit configured to determine whether or not the executed job is an input job that has the log of the input job and image data related to the log referred to as a reference destination of the link log included in job history information of the output job which is executed after the input job has been executed, according to a type of the executed job; an appending unit configured to append, to the image data related to the log, information indicating whether or not job history information image data has already been generated; a generation determination unit configured to determine based on the information appended by the appending unit whether or not job history information image data has already been generated; an image data generation unit configured to generate the image data related to the log of the executed job as job history information image data; a log generation unit configured to generate a log or a link log of the executed job; and a sending unit configured to send the job history information including the log and the job history information image data related to the log or the link log to the data server according to the operating condition setting, wherein the link log includes information as a reference destination of the image data when the job uses the job history information image data saved in the data server, and the image data generation unit generates the job history information image data when the job determination unit determines that the executed job is the input job, and the generation determination unit determines that the job history information image data has not been generated yet.

According to third aspect of the present invention, there is provided a control method of a job history information auditing system including an image forming apparatus which generates job history information including a log and image data or a link log upon execution of a job, and a data server which saves the job history information in a searchable state, the method comprising: controlling the image forming apparatus to execute, a setting information acquisition step of controlling a setting information acquisition unit of the image forming apparatus to acquire an operating condition setting associated with execution of a job and generation of a log, a job determination step of controlling a job determination unit of the image forming apparatus to determine whether or not the executed job is an input job that has the log of the input job and image data related to the log referred to as a reference destination of the link log included in job history information of the output job which is executed after the input job has been executed, according to a type of the executed job, an appending step of controlling an appending unit of the image forming apparatus to append, to the image data related to the log, information indicating whether or not job history information image data has already been generated, a generation determination step of controlling a generation determination unit of the image forming apparatus to determine based on the information appended in the appending step whether or not job history information image data has already been generated, an image data generation step of controlling an image data generation unit of the image forming apparatus to generate the image data related to the log of the executed job as job history information image data, a log generation step of controlling a log generation unit of the image forming apparatus to generate a log or a link log of the executed job, and a sending step of controlling a sending unit of the image forming apparatus to send the job history information including the log and the job history information image data related to the log or the link log to the data server according to the operating condition setting, wherein the link log includes information as a reference destination of the image data when the job uses the job history information image data saved in the data server, and in the image data generation step, the job history information image data is generated when it is determined in the job determination step that the executed job is the input job, and it is determined in the generation determination step that the job history information image data has not been generated yet.

According to fourth aspect of the present invention, there is provided a computer-readable medium storing a program making an image forming apparatus function as: a setting information acquisition unit configured to acquire an operating condition setting; a job determination unit configured to determine whether or not an executed job is an input job that has the log of the input job and image data related to the log referred to as a reference destination of a link log included in job history information of the output job which is executed after the input job has been executed, according to a type of the executed job; an appending unit configured to append, to the image data related to the log, information indicating whether or not job history information image data has already been generated; a generation determination unit configured to determine based on the information appended by the appending unit whether or not job history information image data has already been generated; an image data generation unit configured to generate the image data related to the log of the executed job as job history information image data; a log generation unit configured to generate a log or a link log of the executed job; and a sending unit configured to send the job history information including the log and the job history information image data related to the log or the link log to a data server according to the operating condition setting, wherein the link log includes information as a reference destination of the image data when the job uses the job history information image data saved in the data server, and the image data generation unit generates the job history information image data when the job determination unit determines that the executed job is the input job, and the generation determination unit determines that the job history information image data has not been generated yet.

Log inconsistency can be prevented from occurring, while attaining a network load reduction. In addition, the security required to prevent information leakages can be enhanced.

Further features of the present invention will become apparent from the following description of embodiments (with reference to the attached drawings).

BRIEF DESCRIPTION OF THE DRAWINGS

FIG. 5 is a table showing the contents of jobs to be executed by the digital MFP according to the embodiment;

FIG. 7 is a view showing an example of a log generated by the digital MFP according to the embodiment;

FIGS. 8A to 8C are views showing job history information saved in the data server according to the embodiment, and a job history information setting example;

FIG. 9 is a flowchart showing processing for setting operating conditions associated with the digital MFP and image processing server according to the embodiment;

FIGS. 10A and 10B are operation flowcharts of the digital MFP according to the embodiment;

FIG. 11 is a flowchart showing job execution processing of the digital MFP according to the embodiment;

FIG. 17 is a view showing an example of a setting screen in the digital MFP according to the embodiment.

DESCRIPTION OF THE EMBODIMENTS

<First Embodiment>

The best mode for carrying out the present invention will be described hereinafter with reference to the drawings. Note that in this specification, a job that saves reusable image data in a digital MFP as an image forming apparatus will be referred to as an "input job". A job at the time of reusing (for example, printing) image data saved by the input job will be referred to as an "output job". Furthermore, the aforementioned "job history information" will be defined as a combination of a "log" and "image data" to be described below. Image data obtained by converting an input image into data, and reduced-scale image data obtained by reducing the image data will be referred to as "image data". Information such as user information who executed a job, date and time information of execution, information (IP address or serial number) used to specify a digital MFP that executed the job, and a type of the executed job will be referred to as a "log". Of such "log", a log that holds a link to "image data" already saved in a server will be referred to as a "link log". (The job history information including the "link log" does not include any image data.)

Figure 1:
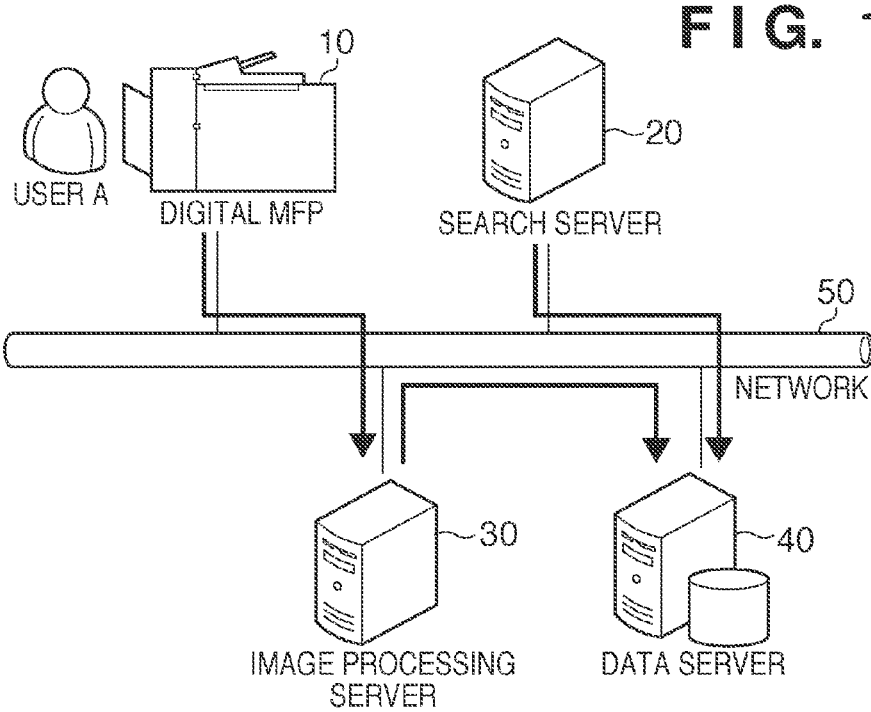
FIG. 1 is a diagram showing the overall arrangement of a job history information auditing system according to an embodiment of the present invention.

FIG. 1 is a diagram showing the overall arrangement of a job history information auditing system according to an embodiment of the present invention. In FIG. 1, a digital MFP 10 as an example of an image forming apparatus, search server 20, image processing server 30, and data server 40 are connected via a network 50.

The digital MFP 10 has, for example, scan, print, copy, e-mail, and FAX functions. The digital MFP 10 has a function called "user BOX", which saves image data in the apparatus, and also a function of sending image data saved in the user BOX as FAX data or an e-mail message. The digital MFP 10 has a function of simultaneously recording job history information in association with a job executed on the apparatus.

When an input job is executed, the digital MFP 10 locally temporarily saves a log and image data, and sends them to the image server 30 as soon as a designated sending time is reached. When an output job is executed, the digital MFP 10 sends a log including reference information to the image data sent at the time of execution of the input job to the image processing server 30 in place of the image data.

The image processing server 30 applies data conversion processing to job history information sent from the digital MFP 10, and saves the conversion result in the data server 40. The data conversion processing in this case is processing for extracting text information by applying OCR processing to image data, and converting the format of image data. The text information obtained by the data conversion processing is saved in the data server 40 to be related to the job history information, and is used upon searching for the job history information. The job history information includes user information who executed that job, date and time information of execution, information (IP address or serial number) used to specify the digital MFP that executed the job, and a type of the executed job. Furthermore, the job history information may include image data obtained by converting an input image into data or reduced-scale image data obtained by reducing the image data.

The data server 40 saves image data, text information related to job history information, and logs sent from the image processing server 30. This embodiment is premised on that a database exists on the data server. However, either a database or file system may be used as long as it can save and hold job history information in a searchable state. In this embodiment, the database is searchable from the search server 20. The job history information saved in the data server 40 is deleted when it satisfies a predetermined condition. The predetermined condition is normally a saving period of the job history information, and the job history information after a predetermined period elapses is deleted in turn. The delete processing is executed at a predetermined timing (for example, once per day).

The search server 20 accepts search conditions from the user, acquires job history information which matches the search conditions from those saved in the data server 40, and presents the acquired information to the user. The search conditions include job attributes such as a job execution user and a date and time of execution, and a character string included in text information. The search server 20 searches for job history information saved in the data server 40 using the designated search conditions as keywords.

FIG. 1 illustrates respective PCs as independent components, but these functions may be included in a single PC. Also, these functions may be included in an arbitrary number of PCs in arbitrary combinations.

Figure 2:
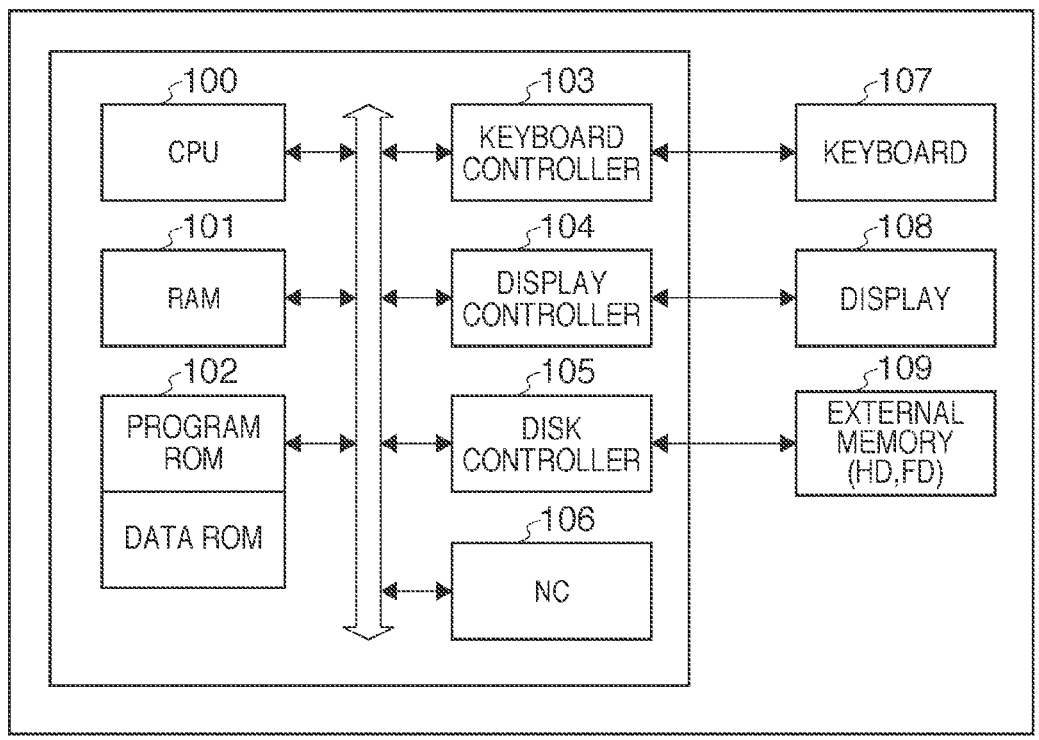
FIG. 2 is a block diagram showing the hardware arrangement of a search server, image processing server, and data server according to the embodiment.

FIG. 2 is a block diagram showing the hardware arrangement of a PC that configures each of the search server 20, image processing server 30, and data server 40 shown in FIG. 1. Assume that the block diagram of the hardware arrangement shown in FIG. 2 corresponds to that of a general information processing apparatus, and the hardware arrangement of the general information processing apparatus can be applied to each PC of this embodiment.

Referring to FIG. 2, a CPU 100 executes programs such as an OS and applications, which are stored in a program ROM of a ROM 102 or are loaded from a hard disk 109 onto a RAM 101. The same applies to all the following processing sequences. Note that the OS is short for an operating system, which runs on a computer, and the operating system will be abbreviated as an OS hereinafter. The processes of the flowcharts to be described later can be implemented by executing this program. The RAM 101 serves as, for example, a main memory and work area of the CPU 100. A keyboard controller 103 controls key inputs from a keyboard 107 and a pointing device (not shown). A display controller 104 controls display of various types of displays 108. A disk controller 105 controls data accesses to the hard disk (HD) 109 and a Floppy® disk (FD), which store various data. An NC 106 is connected to the network, and executes communication control processing with other devices connected to the network.

Figure 3:
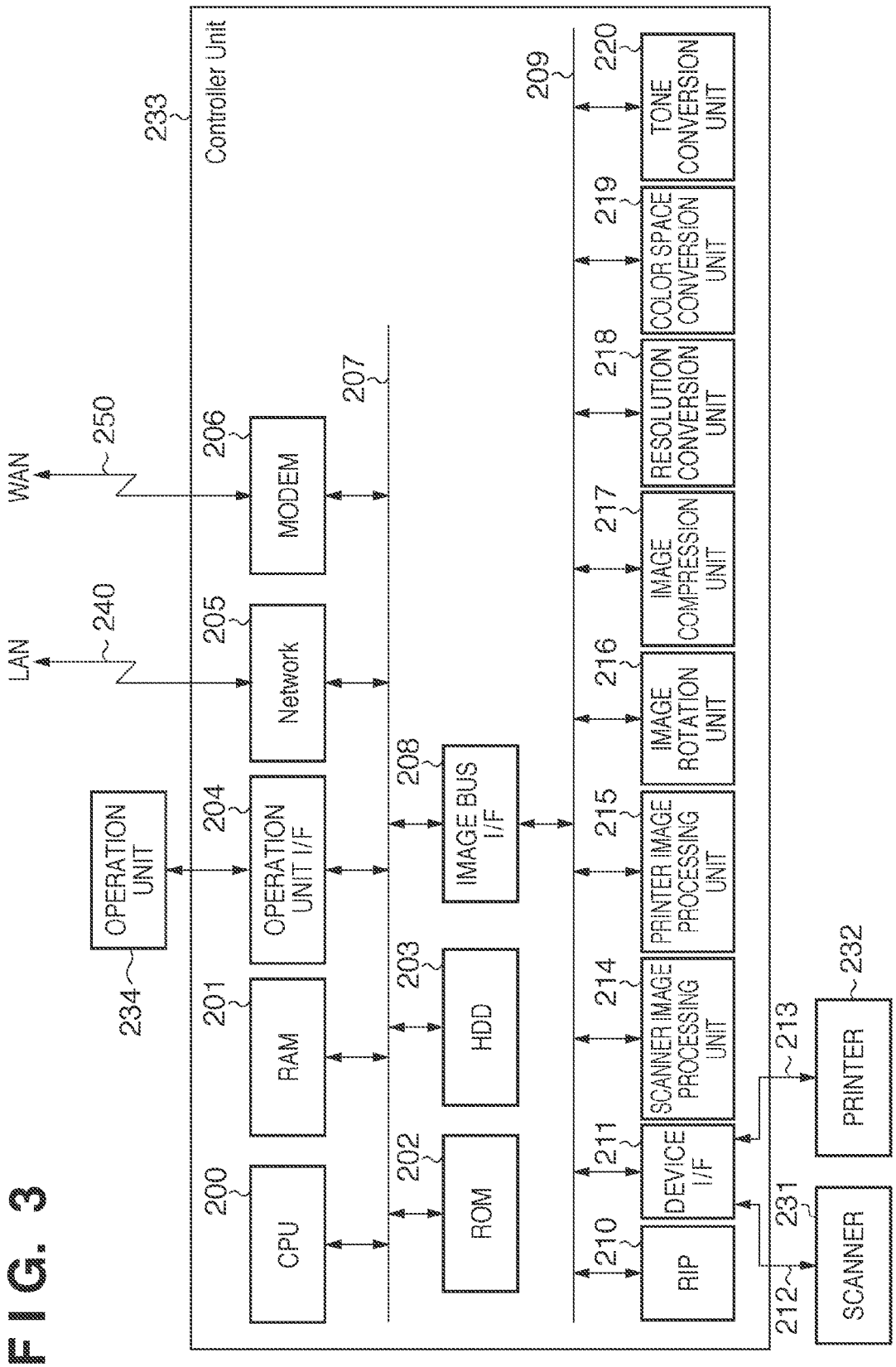
FIG. 3 is a block diagram showing the arrangement of a digital MFP according to the embodiment.

FIG. 3 is a block diagram showing the arrangement of the digital MFP 10 shown in FIG. 1. A controller unit 233 is connected to a scanner 231 as an image input device and a printer 232 as an image output device. Also, the controller unit 233 is connected to a network (LAN) 240 and public network (WAN) 250. Thus, the controller unit 233 inputs and outputs image data and device information.

In the controller unit 233, a CPU 200 is a controller which controls the overall system. A RAM 201 is a system work memory required for the CPU 200 to operate, and also an image memory (buffer memory) used to temporarily store input image data. A ROM 202 is a boot ROM, and saves a boot program of the system. A hard disk drive (HDD) 203 saves system software, job history information, and image data in the user BOX. A function of saving job history information in the digital MFP and sending it to the server as a characteristic feature of this embodiment is implemented by the system software saved in the HDD 203. An operation unit I/F 204 is an interface with an operation unit 234, and outputs screen data to be displayed on the operation unit 234 to the operation unit 234. The operation unit I/F 204 has a role to transfer information input by an operator from the operation unit 234 to the CPU 200. Note that the operation unit 234 may be either a screen equipped on the digital MFP or a screen (display 108) remotely provided by a program in the digital MFP from an external device such as a PC. A network unit (Network) 205 is connected to the network (LAN) 240 to input/output information. A modem (MODEM) 206 is connected to the public network (WAN) 250 to input/output image data. The aforementioned devices are connected on a system bus 207. An image bus (Image Bus) I/F 208 is a bus bridge which connects the system bus 207 and an image bus 209 which transfers image data at high speed, and converts data structures. On the image bus 209, the following devices are connected.

A raster image processor (RIP) 210 rasterizes PDL code data into bitmap image data. A device I/F unit 211 connects the scanner 231 and printer 232 as the image input and output devices to the controller unit 233 via an image input unit interface 212 and print unit interface 213 to convert image data. A scanner image processing unit 214 corrects, modifies, and edits input image data. The scanner image processing unit 214 has a function of judging based on a saturation signal of image data whether the input image data is that of a color or monochrome original, and holding that result. A printer image processing unit 215 corrects, modifies, and edits output image data. An image rotation unit 216 rotates image data simultaneously with an image scanning operation from the scanner 231 in cooperation with the scanner image processing unit 214, and saves the rotated image data on a memory. Or the image rotation unit 216 rotates image data on the memory, and saves it on the memory. Or the image rotation unit 216 can print out image data on the memory while rotating it in cooperation with the printer image processing unit 215. An image compression unit 217 applies compression/decompression processing to multi-valued image data based on JPEG or to binary image data based on JBIG, MMR, MR, or MH. A resolution conversion unit 218 applies resolution conversion processing to image data on the memory, and saves the processed data on the memory. A color space conversion unit 219 converts, for example, YUV image data on the memory into Lab image data using matrix calculations, and saves the converted data on the memory. A tone conversion unit 220 converts, for example, image data of 8 bits and 256 tones on the memory into that of 1 bit and 2 tones by a method such as error diffusion, and saves the converted data on the memory. The image rotation unit 216, image compression unit 217, resolution conversion unit 218, color space conversion unit 219, and tone conversion unit 220 can cooperate with each other. For example, when image data on the memory is to undergo image rotation and resolution conversion, these two processes can be applied without the intervention of the memory.

Figure 4:
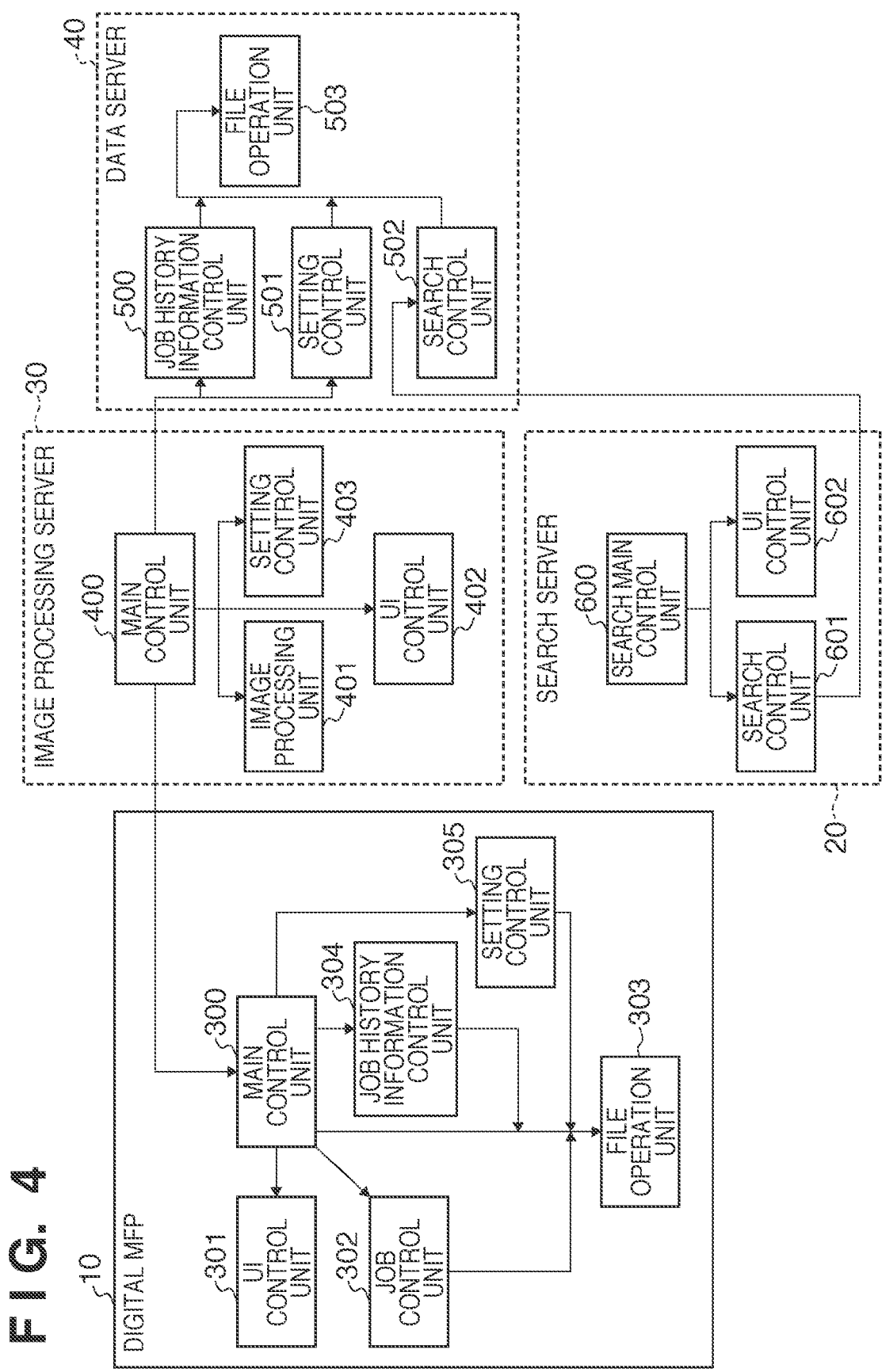
FIG. 4 is a block diagram showing an example of the software arrangement of the digital MFP, search server, image processing server, and data server according to the embodiment.

FIG. 4 is a block diagram showing an example of the software arrangement of the digital MFP 10, search server 20, image processing server 30, and data server 40 shown in FIG. 1. In the digital MFP 10, a main control unit 300 controls the overall digital MFP 10, and instructs and manages respective units to be described below. Also, the main control unit 300 issues a job execution instruction to a job control unit 302 and a job history information generation instruction to a job history information control unit 304 in accordance with user instruction contents from a UI control unit 301. The UI control unit 301 totally controls processing associated with user operations in the digital MFP 10. More specifically, the UI control unit 301 displays a user interface on the operation unit 234 of the digital MFP 10, and passes instruction contents received from the user to the main control unit 300. The job control unit 302 receives a user instruction via the main control unit 300, and executes a designated job. In this case, the job control unit 302 refers to setting information, image data, and job history information in the HDD 203 via the main control unit 300 and a file operation unit 303. The file operation unit 303 is a control unit required to input/output setting information, image data, and job history information in the HDD 203, and executes processing in response to processing requests from respective units. The job history information control unit 304 generates job history information at the time of execution of a job in accordance with an instruction from the main control unit 300, and saves the job history information via the file operation unit 303. The job history information control unit 304 receives setting information associated with job history information generation processing and job history information sending processing from the image processing server 30, and saves the received information via the file operation unit 303. A setting control unit 305 controls operating condition setting information associated with the digital MFP 10. The setting control unit 305 receives an operating condition setting instruction via the main control unit 300, and refers to and saves the setting information via the file operation unit 303.

In the image processing server 30, a main control unit 400 controls the overall image processing server 30, and instructs and manages respective units to be described below. An image processing unit 401 applies OCR processing and image format conversion to image data in accordance with an instruction from the main control unit 400. A UI control unit 402 displays a user interface on the display 108 of the image processing server 30, and accepts an instruction from the user using the keyboard 107. The UI control unit 402 saves setting information designated by the user in the data server 40 via the main control unit 400. A setting control unit 403 controls operating condition setting information associated with the image processing server 30. The setting control unit 403 receives an operating condition setting instruction via the main control unit 400, and saves the setting information in the data server 40.

In the data server 40, a job history information control unit 500 accepts job history information reference and save instructions via the main control unit 400 of the image processing server 30, and executes job history information control according to the instructions. A setting control unit 501 accepts reference and saving instructions associated with setting information of each component via the main control unit 400 of the image processing server 30, and executes setting information control according to the instructions. A search control unit 502 accepts search conditions and a search execution instruction from the search server 20, and returns search results. A file operation unit 503 accepts instructions from respective control units, and refers to and saves setting information and job history information in the HDD 203.

In the search server 20, a search main control unit 600 controls the overall search server 20, and instructs and manages respective units to be described below. A search control unit 601 controls search processing. The search control unit 601 issues a search instruction to the search control unit 502 of the data server 40 based on search conditions received from the search main control unit 600, and receives search results. The search control unit 601 sorts the search results as needed, and passes the search results to the search main control unit 600. A UI control unit 602 displays a user interface on the display 108 of the search server 20 so as to set search conditions, and accepts search conditions from the user using the keyboard 107. The UI control unit 602 passes the received search conditions to the search control unit 601 via the search main control unit 600. The UI control unit 602 presents the search results received from the search control unit 601 via the search main control unit 600 to the user via the user interface.

FIG. 5 is a table which defines classifications of input and output jobs, image data recording methods, and input jobs that can be reference information in case of output jobs in association with jobs executed by the digital MFP 10, and presents them as a list. Note that the input job is a job associated with an image input at the time of execution of the job of the digital MFP 10. For example, a COPY job is an input job which has an original scanned by the scanner 231 as an input image. When the input job is executed, a log and image data are recorded as job history information. At this time, a document ID used to uniquely identify image data is appended. Also, the output job is a job which outputs image data input to the digital MFP 10 by the input job. For example, a BOX-PRINT job executes print processing using image data, which is stored in a user BOX area in the HDD 203 by a BOX storage job in advance. When the output job is executed, a document ID of used image data is recorded as reference destination information in place of image data. As for information as to whether or not to record job history information, the user decides jobs for which job history information is to be recorded, based on setting information designated in the image processing server 30 or operation unit 234.

Note that job definitions are not limited to those shown in FIG. 5, and other jobs may be defined, or items included in each job may be added.

A field of an input job that can be reference destination information of an output job shows input jobs referred to as reference information of the output job which is executed after the input jobs have been executed. In fact, image data related to logs of the input jobs are referred to as the reference information. Even when these input jobs are designated not to record job history information, job history information of each of the listed-up input jobs is recorded so as not to empty reference destination information of an output job. For example, assume that even when the user designates not to record job history information for a "SCAN job/BOX storage job", he or she designates to record job history information for a "sending job (FAX/I-FAX/SEND)". In this case, job history information of the input job "SCAN job/BOX storage job/receiving job (FAX/I-FAX)" that can be reference destination information of an output job is automatically recorded.

Figure 6:
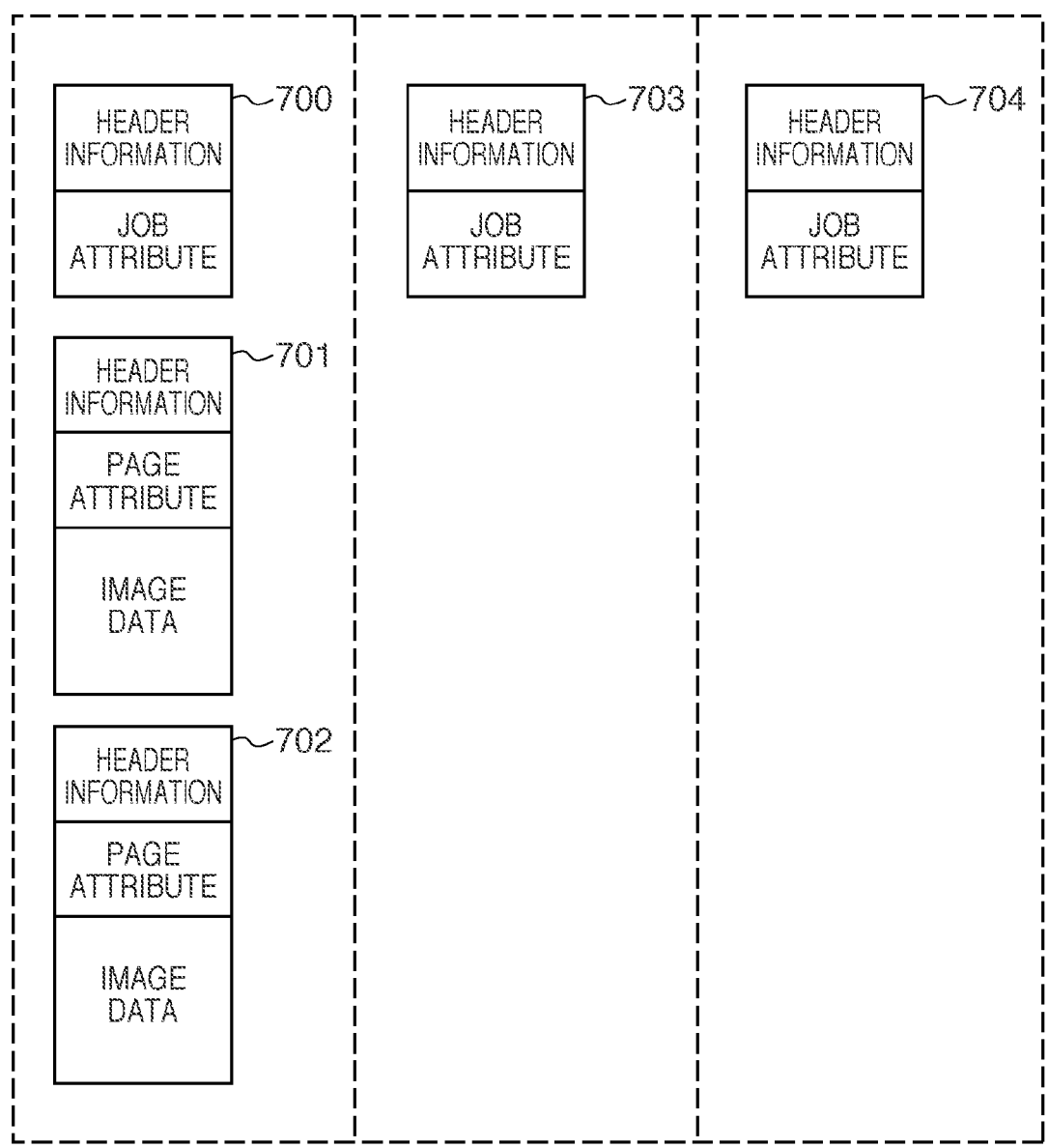
FIG. 6 is a view showing an example of the data configuration of job history information recorded by the digital MFP according to the embodiment.

FIG. 6 shows an example of the data configuration of job history information recorded by the digital MFP 10 in the HDD 203. In this example, as job history information of an input job, a log 700 and image data 701 and 702 for respective pages are successively recorded. As job history information of an output job, link logs 703 and 704 are recorded. A job attribute and page attribute are recorded while being appended with header information including a format version and data size. Image data is data that represents the contents of the job. The image data normally has an image format, but it may be text data or binary data having a non-image format. A format of image data, an image size in case of the image format, a resolution, and the like are recorded in the page attribute. The job history information includes a document ID to be referred to. In case of the input job, a log including the document ID, and image data having that document ID are recorded together. In case of the output job, the document ID of used image data is recorded in a link log in place of image data. That is, the log of the input job and the link log of the output job which used the image data input by that input job have the same document ID.

FIG. 7 shows an example of a log generated by the job history information control unit 304 of the digital MFP 10. In FIG. 7, the log is recorded in an XML format. In this example, a logInformation element 701 at a root that represents the log includes a deviceInformation element 702, userInformation element 703, and jobInformation element 704. The deviceInformation element 702 represents device information such as a device name and serial number. The userInformation element 703 represents user information such as a department ID and user name. The jobInformation element 704 represents job information such as a job type, job name, and start date and time. A documentID element 705 is a document ID, and is a unique value indicating image data input by the input job. A documentFlag is an image data flag, which records "yes" when image data is included, or "no" when no image data is included. In case of a job attribute of the output job, the image data flag is "no", and the document ID in this case is reference information indicating image data of another input job.

FIG. 8A shows an example of job history information saved in the data server 40. In FIG. 8A, a history of a BOX storage job executed on Apr. 1, 2009 is saved to have a log ID=00001. A document ID 801 corresponding to this log is "aaaaa", and since this job is an input job, image data having the document ID "aaaaa" is simultaneously saved in the data server 40. Likewise, a COPY job (input job) which was executed on Apr. 10, 2009 and has a log ID=00002 is saved in the data server as a log and image data having a document ID "bbbbb". Note that the job history information is not limited to items shown in FIG. 8A, but may include other items.

FIG. 8B shows an example of job history information saved in the data server 40 as in FIG. 8A, and shows a state in which a new output job is input from the state shown in FIG. 8A. A BOX-PRINT job, which was executed on Apr. 20, 2009, and has a log ID=00003 is an output job. For this reason, this job has the document ID "aaaaa", and a link log which refers to the document ID of the previously executed input job is stored. That is, the BOX storage job having the log ID=00001 and the BOX-PRINT job having the log ID=00003 use the same image data. For this reason, no new image data is saved in FIG. 8B.

FIG. 8C shows an example of the setting information associated with recording time periods of job history information saved in the data server 40. The job history information auditing system decides whether or not to record job history information according to this setting information. More specifically, the image processing server 30 saves setting information accepted from the user in the data server 40. In response to a setting information acquisition request from the digital MFP 10, the image processing server 30 acquires setting information from the data server 40, and notifies the digital MFP 10 of the setting information. In this way, job history information is recorded according to the setting information. An item "record in full time" shown in FIG. 8C indicates whether or not to record job history information in a full time period for each day of the week by Yes/No. If No is set in this item, a recording time period can be designated. This example allows to designate up to two time periods, that is, a service time period in the morning and that in the afternoon. However, the number of time periods that can be designated may be one or three or more.

FIG. 9 is a flowchart showing processing for setting operating conditions associated with the digital MFP 10 and image processing server 30 according to this embodiment. Assume that the user designates operating condition settings using the UI control unit 402 of the image processing server 30, which saves the designated settings in the HDD 109 via the file operation unit 503 of the data server 40. However, the setting information may be saved in the HDD 109 of the image processing server 30 in place of that of the data server 40. In step S100, the user designates whether or not to record job history information for all job types via the UI control unit 402. If job history information is recorded for not all the job types, the user designates job types for which job history information is recorded. In step S101, the setting control unit 403 internally generates an input job list corresponding to the designated job types. This information is generated by listing input jobs which can be reference destination information of output jobs shown in FIG. 5. For each job type in this list, job history information is to be recorded even when it is designated in a setting "whether or not to record job history information" in FIG. 5 that job history information is not recorded for that job type. Practical examples of such job types will be described below using FIG. 5. That is, these job types correspond to a COPY job, PDL-PRINT job, SCAN job/BOX storage job, and receiving job (FAX/I-FAX). In step S102, the user designates days of the week and time periods on and in which job history information is to be recorded, via the UI control unit 402. In step S103, the user designates job history information sending permitted time periods via the UI control unit 402. In step S104, the user designates an inquiry timing of the digital MFP 10 to the image processing server 30 via the UI control unit 402. The inquiry contents include the presence/absence of changes of operating condition setting contents, and the change contents when the settings have been changed. As the timing to be designated in this step, a predetermined inquiry time interval may be designated, or a schedule including dates and times, days of the week, and inquiry start times such as 19:00 on everyday or 10:00 on every Saturday may be designated. In step S105, the UI control unit 402 saves the setting information designated by the user in step S100 and the subsequent steps in the HDD 109 of the data server 40 via the main control unit 400 and setting control unit 501.

FIG. 10A is a flowchart of processing executed when the digital MFP 10 acquires operating condition setting information as a part of initialization processing at the launch timing. This flowchart is started in response to an instruction of the main control unit 300 at the timing at which the main control unit 300 executes the initialization processing when the digital MFP 10 is launched. In step S200, the setting control unit 305 loads the operating condition setting information and setting information inquiry schedule saved in the HDD 203. The loaded information is saved in the RAM 201, and the main control unit 300 instructs the respective control units based on this information. Note that the operating condition setting information includes all operating conditions designated by the user in FIG. 9. The setting information inquiry schedule is information of a timing which is designated in step S104 in FIG. 9, and at which the digital MFP sends an inquiry about the operating condition setting information to the image processing server 30.

FIG. 10B is a flowchart showing processing executed when the digital MFP 10 sends an inquiry about the operating condition setting information, which is set in the image processing server 30, as shown in FIG. 9, to the image processing server 30. This flowchart is executed when a time designated in the setting information inquiry schedule to the image processing server 30 is reached. In step S210, the main control unit 300 sends a setting information acquisition request to the main control unit 400 of the image processing server 30. In step S211, the main control unit 300 receives the operating condition setting information from the main control unit 400 of the image processing server 30. In step S212, the main control unit 300 saves the operating condition setting information in the HDD 203 via the file operation unit 303. Also, the main control unit 300 updates the information saved in the RAM 201 in step S200 in FIG. 10A. Note that this embodiment has been described under the assumption that the digital MFP 10 sends an inquiry to the image processing server 30. Alternatively, as another embodiment, the image processing server 30 may notify the digital MFP 10 of the setting changes.

FIG. 11 is a flowchart showing job execution processing in the digital MFP 10. In step S300, the main control unit 300 of the digital MFP 10 accepts a job execution instruction from the user via the UI control unit 301 or based on a timer setting, which is set in advance by the user. The main control unit 300 sends the designated job execution instruction to the job control unit 302, and also sends a job history information recording instruction to the job history information control unit 304. In step S301, the job control unit 302 executes a job. In step S302, the main control unit 300 determines based on the operating condition setting information saved in step S200 in FIG. 10A or in step S212 in FIG. 10B whether or not the job execution time falls within a job history information recording time period. If it is determined in step S302 that the job execution time falls outside the job history information recording time period, this processing sequence ends. If the job execution time falls within the job history information recording time period, the job history information control unit 304 determines in step S304 whether or not the executed job has a job type as a job history information recording target. Whether or not the executed job has a job type as the job history information recording target is determined based on information shown in FIG. 5. This process implements a job determination unit. This embodiment has been described under the assumption that the digital MFP 10 sends an inquiry about the information shown in FIG. 5 as a part of the operating condition setting information to the image processing server 30. However, the digital MFP 10 may receive a notification from the image processing server 30. If it is determined in step S304 that the executed job does not have the recording target job type, this processing sequence ends. If the executed job has the job type as the job history information recording target, the job history information control unit 304 determines in step S305 whether or not the input job list generated in step S101 in FIG. 9 includes the executed job type. If the input job list does not include the executed job type (that is, in case of an output job), the job history information control unit 304 handles that job as the job history information recording target, and determines in step S306 and subsequent steps whether or not image data to be sent as job history information has already been generated. If the input job list includes the executed job type, the process jumps to step S308. Note that the image data to be sent indicates image data generated to send a log and image data related to the log as job history information. Such image data will be referred to as job history information image data hereinafter.

In step S306, the job history information control unit 304 acquires date information including a date and time of generation and a date and time of updating of the image data as the job execution target. In this embodiment, this process implements a date information acquisition unit. In step S307, the job history information control unit 304 compares the date and time of generation and the date and time of updating acquired in step S306 to determine if they have a time difference. In this embodiment, this process implements a date information comparing unit. If these dates and times have no time difference (if they match), the job history information control unit 304 determines that job history information image data has not been generated yet in the image processing server 30, and the process advances to step S308. In this embodiment, the processes in steps S306 and S307 implement a generation determination unit. If the date and time of generation and the date and time of updating have a time difference, the job history information control unit 304 determines that the image data has already been generated, and the process jumps to step S310. In step S308, the job history information control unit 304 generates job history information image data to be sent to the image processing server 30. In this process, the job history information control unit 304 may use the image data saved in the HDD 203 intact or may generate new image data, the size of which is suppressed by lowering a resolution so as to realize a lightweight communication. This process implements an image data generation unit. In step S309, the job history information control unit 304 updates the date and time of updating of the image data saved in the HDD 203 by the current date and time via the file operation unit 303. In step S310, the job history information control unit 304 generates a log. In the log generation process in step S310, when the job history information image data is generated in the processes in steps S300 to S309 (that is, when new, reusable image data is to be saved in the data server), a log is generated. By contrast, when no job history information image data is generated (that is, when the job history information image data has already been saved in the data server), a link log is generated. This process implements a log generation unit. In step S311, the job history information control unit 304 temporarily saves job history information as a combination of the log and image data or that of the link log in the HDD 203.

Figure 12A:
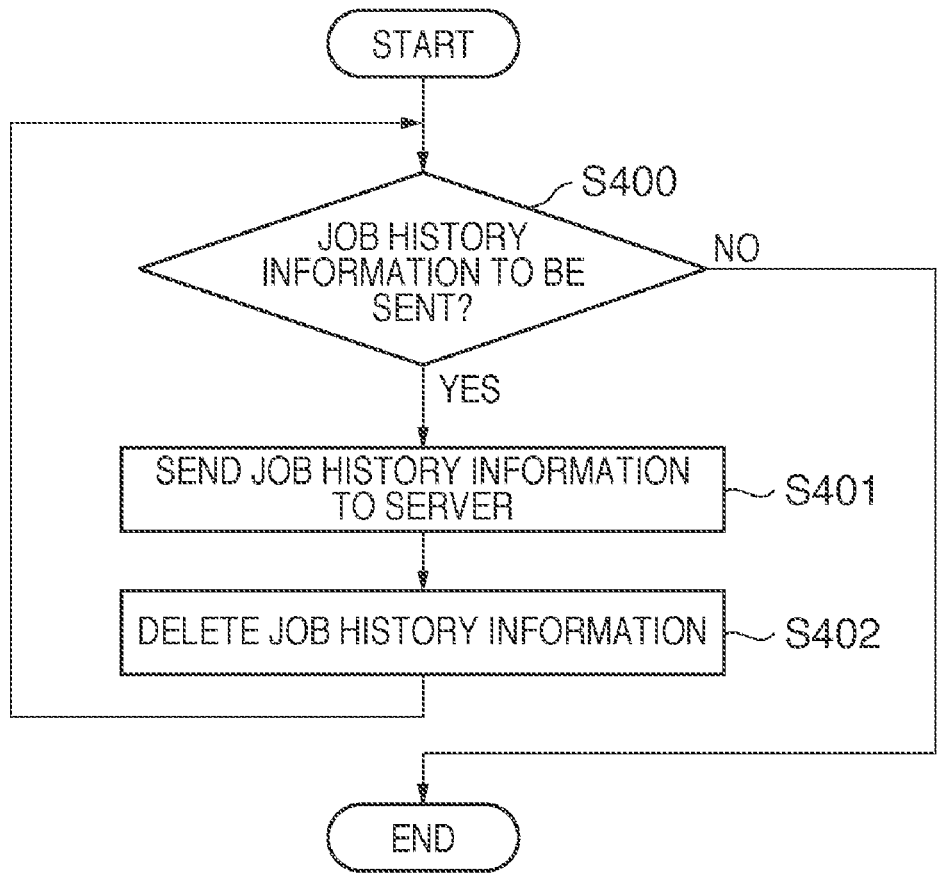
FIGS. 12A and 12B are flowcharts showing job history information sending/receiving processing according to the embodiment.

FIG. 12A is a flowchart showing processing in the digital MFP 10 upon sending job history information to the image processing server 30. This flowchart shows processing executed when a sending permitted time period is reached according to the operating condition setting information acquired in FIGS. 10A and 10B. The job history information control unit 304 determines in step S400 whether or not pieces of job history information temporarily saved in the HDD 203 include that to be sent. If job history information to be sent is included, the process advances to step S401. If no job history information to be sent is included, this processing ends. In step S401, the job history information control unit 304 sends the job history information to the image processing server 30. In step S402, the job history information control unit 304 deletes the job history information temporarily saved in the HDD 203. After that, the process returns to step S400.

Figure 12B:
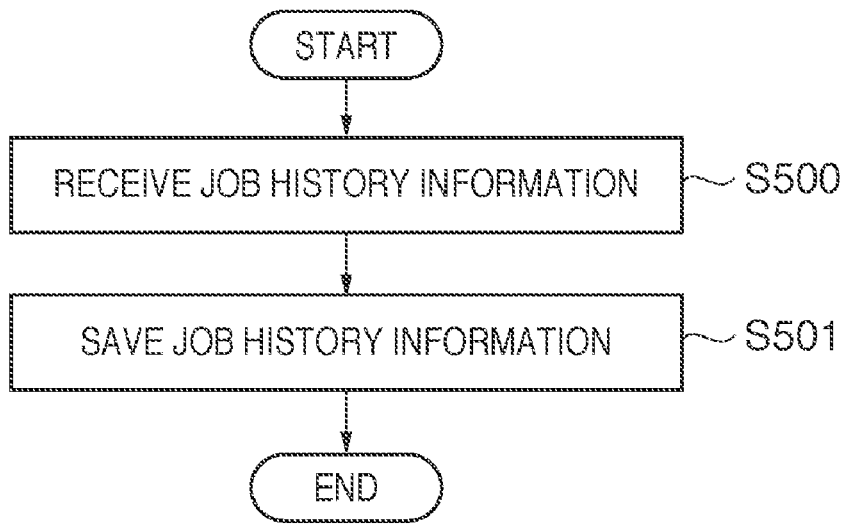

FIG. 12B is a flowchart showing processing executed when the image processing server 30 receives the job history information sent from the digital MFP 10. In step S500, the main control unit 400 of the image processing server 30 receives the job history information from the digital MFP 10. In step S501, the main control unit 400 applies image processing to image data in the received job history information, and shapes a log in that information as needed. After that, the main control unit 400 sends the job history information to the job history information control unit 500 of the data server 40, and saves it in the HDD 109 via the file operation unit 503.

With the above processing, image data which serves as a reference destination of a link log can be saved without any inconsistency while attaining a network load reduction. That is, a reference destination of image data to be reused by a link log upon reusing a log of a job executed during a job history information recording stop time period can be prevented from being unable to be confirmed.

<Second Embodiment>

The second embodiment for carrying out the present invention will be described below with reference to the drawings. This embodiment will not repeat a description of a part redundant to the first embodiment, and will explain only a difference. A principal difference from the first embodiment is as follows. In the first embodiment, whether or not image data has already been sent to an image processing server 30 is determined using a difference between a date and time of generation and a date and time of updating as date information of image data in steps S306 to S309 in FIG. 11. By contrast, the second embodiment uses a flag associated with image data upon execution of an input job, and sets that flag to be ON when image data is sent to the image processing server 30, thus determining whether or not image data has already been sent. That is, flag management is made for image data in place of management based on dates. This embodiment will be described in detail below.

Figure 13:
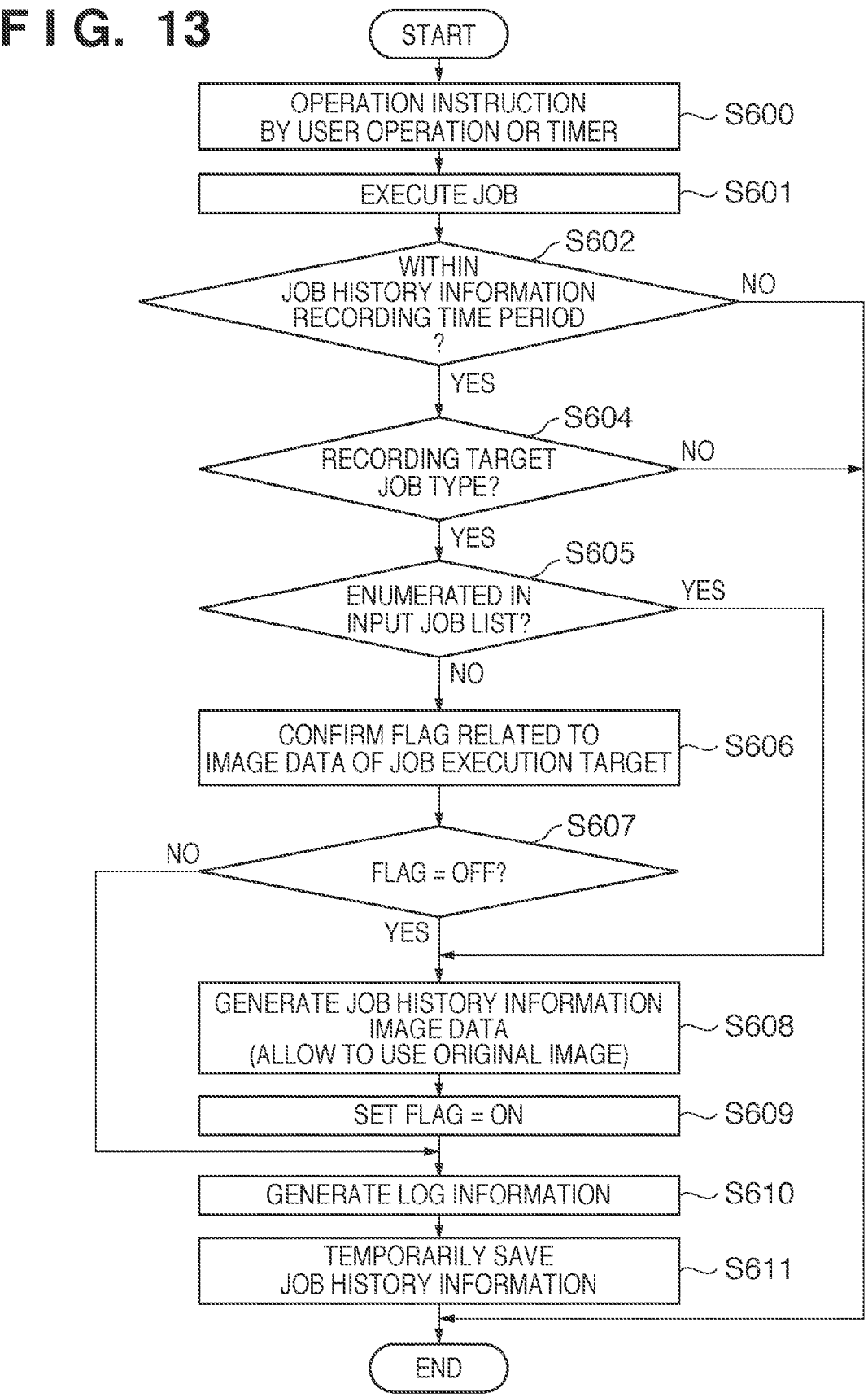
FIG. 13 is a flowchart showing job execution processing of a digital MFP according to the second embodiment.

FIG. 13 is a flowchart showing job execution processing in a digital MFP 10 according to this embodiment. Since processes in steps S600, S602 to S605, S610, and S611 are the same as those in steps S300, S302 to S305, S310, and S311 in FIG. 11, a description thereof will not be repeated. In step S601, a job control unit 302 executes an instructed job. At this time, if the executed job is an input job, the job control unit 302 saves flag information related to image data in an HDD 203 via a file operation unit 303. At this time, the flag is set to be OFF to indicate that job history information image data to be sent to the image processing server 30 is not generated.

In step S606, a job history information control unit 304 acquires the flag information related to the image data. The job history information control unit 304 determines in step S607 if the flag information acquired in step S606 is ON or OFF. If the flag information is OFF, the job history information control unit 304 determines that job history information image data is not generated in the image processing server 30, and the process advances to step S608. If the flag information is ON, the process jumps to step S610. In this embodiment, the processes in steps S606 and S607 implement a generation determination unit. In step S608, the job history information control unit 304 generates job history information image data to be sent to the image processing server 30 as in step S308. In step S609, the job history information control unit 304 updates the flag information related to the image data saved in the HDD 203 to be ON via the file operation unit 303. The subsequent processes are the same as those in FIG. 11.

With the above processing, image data which serves as a reference destination of a link log can be saved without any inconsistency while attaining a network load reduction. That is, a reference destination of image data to be reused by a link log upon reusing a log of a job executed during a job history information recording stop time period can be prevented from being unable to be confirmed.

<Third Embodiment>

The third embodiment for carrying out the present invention will be described below with reference to the drawings. This embodiment will explain only a difference from the first embodiment. A principal difference from the first embodiment is as follows. In the first embodiment, when an output job is executed during a job history information recording time period, image data to be saved in a data server 40 is generated as job history information. Since this embodiment attaches an importance on prevention of generation of any security hole rather than a reduction of a network load, job history information of an input job is recorded even in a set job history information recording stop time period. This embodiment will be described in detail below.

Figure 14:
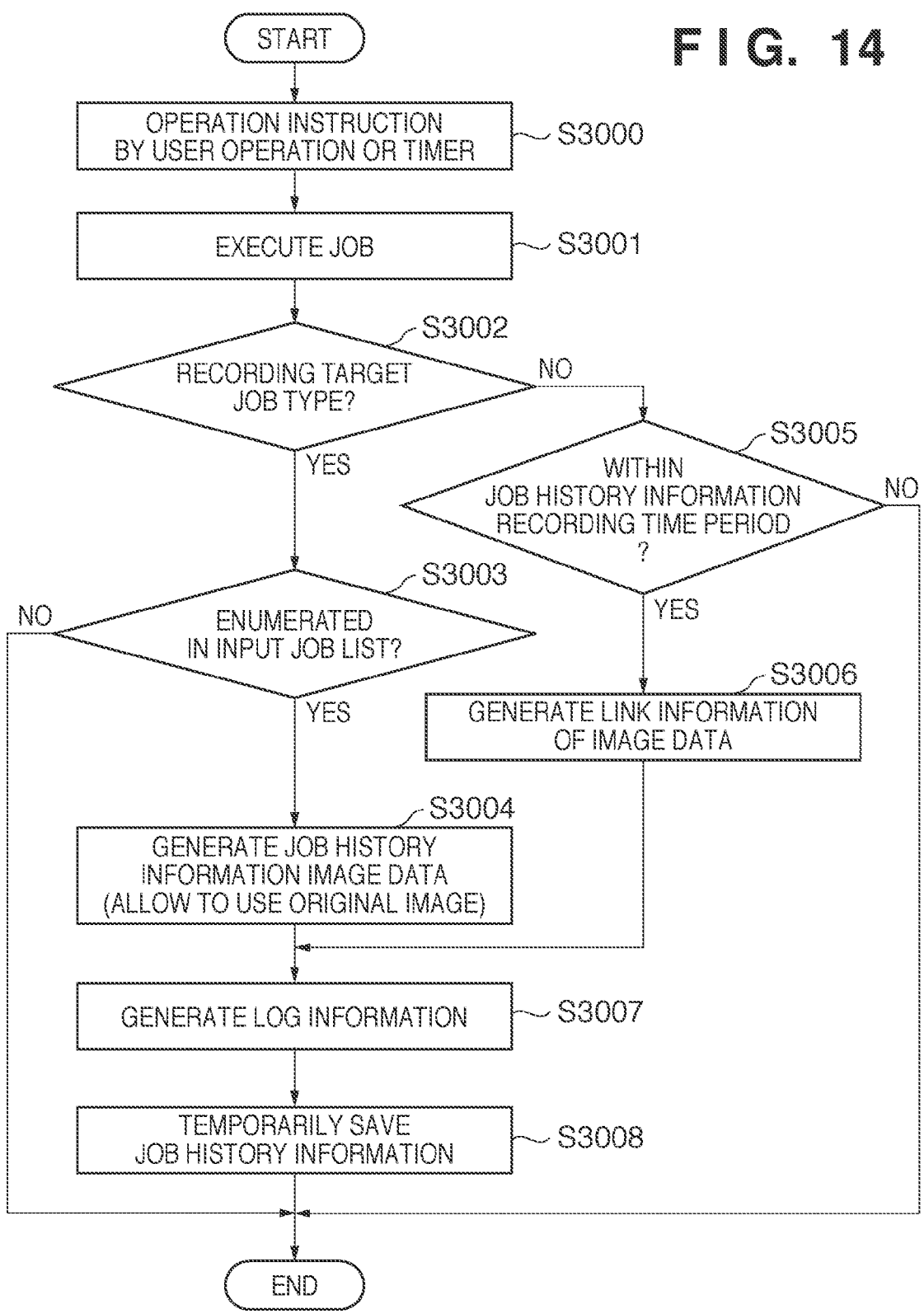
FIG. 14 is a flowchart showing job execution processing of a digital MFP according to the third embodiment.

FIG. 14 is a flowchart showing job execution processing in a digital MFP 10 according to this embodiment. Since processes in steps S3000 and S3001 are the same as those in steps S300 and S301 in FIG. 11, a description thereof will not be repeated. A job history information control unit 304 determines in step S3002 if an executed job has a job type as a job history information recording target. Since this process is the same as that in step S304 in FIG. 11, a detailed description thereof will not be repeated. If the executed job has the job type as the job history information recording target, the process advances to step S3003 to determine whether or not the executed job is an input job for which job history information is to be recorded. If the executed job does not have the job type as the job history information recording target, the process advances to step S3005 to determine whether or not the job execution time falls within a job history information recording time period. The job history information control unit 304 determines in step S3003 whether or not the job executed in step S3001 is enumerated in an input job list. Note that the input job list is a list generated in step S101 in FIG. 9. If the executed job is not enumerated in the input job list, this processing sequence ends. If the executed job is enumerated in the input job list, the job history information control unit 304 generates job history information image data in step S3004. Since this process is the same as that in step S308 in FIG. 11, a detailed description thereof will not be repeated. The job history information control unit 304 determines in step S3005 if the job execution time falls within a job history information recording time period. Since this process is the same as that in step S302 in FIG. 11, a detailed description thereof will not be repeated. If the job execution time falls outside the job history information recording time period, this processing sequence ends. If the job execution time falls within the job history information recording time period, the process advances to step S3006 to generate link information of image data. Since the link information indicates a document ID in practice, which has already been explained in FIG. 6 and FIGS. 8A to 8C, a description thereof will not be repeated. Since processes in steps S3007 and S3008 are the same as those in steps S310 and S311 in FIG. 11, a description thereof will not be repeated.

In this embodiment, since the operating condition setting sequence in the image processing server 30 and setting acquisition sequence are the same as those in FIGS. 9 and FIGS. 10A and 10B, a description thereof will not be repeated. Also, since processing for sending generated job history information from the digital MFP 10 to the image processing server 30 is the same as that in FIGS. 12A and 12B of the first embodiment, a description thereof will not be repeated.

With the aforementioned processing, log inconsistency can be prevented from occurring while attaining a network load reduction. In addition, the security required to prevent any information leakage can be enhanced.

<Fourth Embodiment>

The fourth embodiment for carrying out the present invention will be described below with reference to the drawings. This embodiment will explain only a difference from the third embodiment. A principal difference from the third embodiment is as follows. Since the third embodiment attaches an importance on prevention of generation of any security hole rather than a reduction of a network load, job history information of an input job is recorded even in a set job history information recording stop time period. Since the fourth embodiment reduces a network load and also attaches an importance on prevention of generation of any security hole, when image data of an input job executed during a job history information recording stop time is to be reused, that operation is prohibited. This embodiment will be described in detail below.

Figure 15:
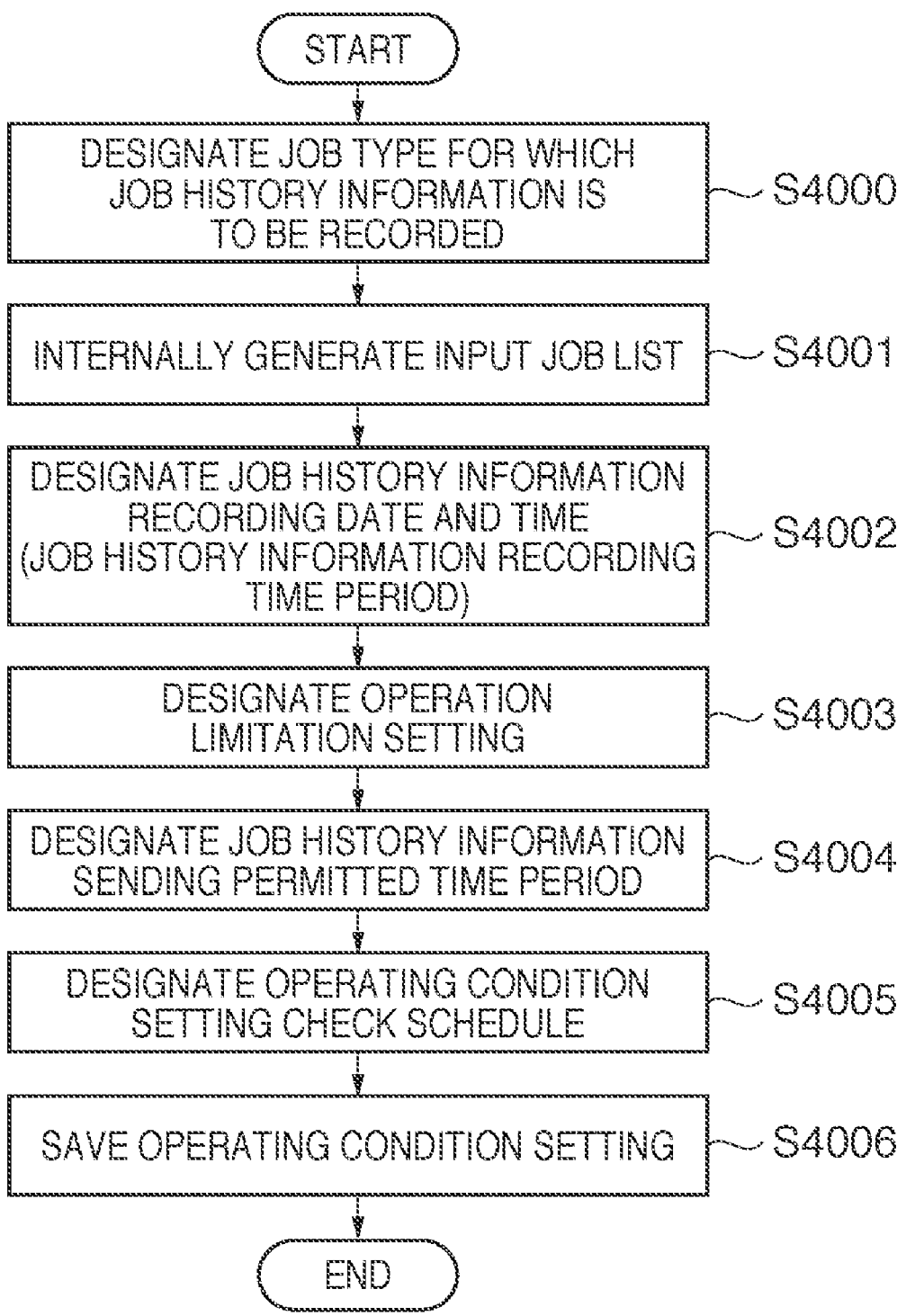
FIG. 15 is a flowchart showing operating condition setting processing of a digital MFP and image processing server according to the fourth embodiment.

FIG. 15 is a flowchart showing processing for setting operating conditions associated with a digital MFP 10 and image processing server 30 according to this embodiment. Since processes in steps S4000 to S4002 and S4004 to S4006 are the same as those in steps S100 to S102 and S103 to S105 in FIG. 9, a description thereof will not be repeated. In step S4003, the user designates whether or not to prohibit an operation for reusing image data of an input job that was executed during a job history information recording stop time period via a UI control unit 402. If the user designates to prohibit that operation, a job that does not record any job history information can no longer be executed. When the user sets this operation limitation, job execution prohibition upon reusing image data in a job history information recording stop time period can be implemented.

Figure 16:
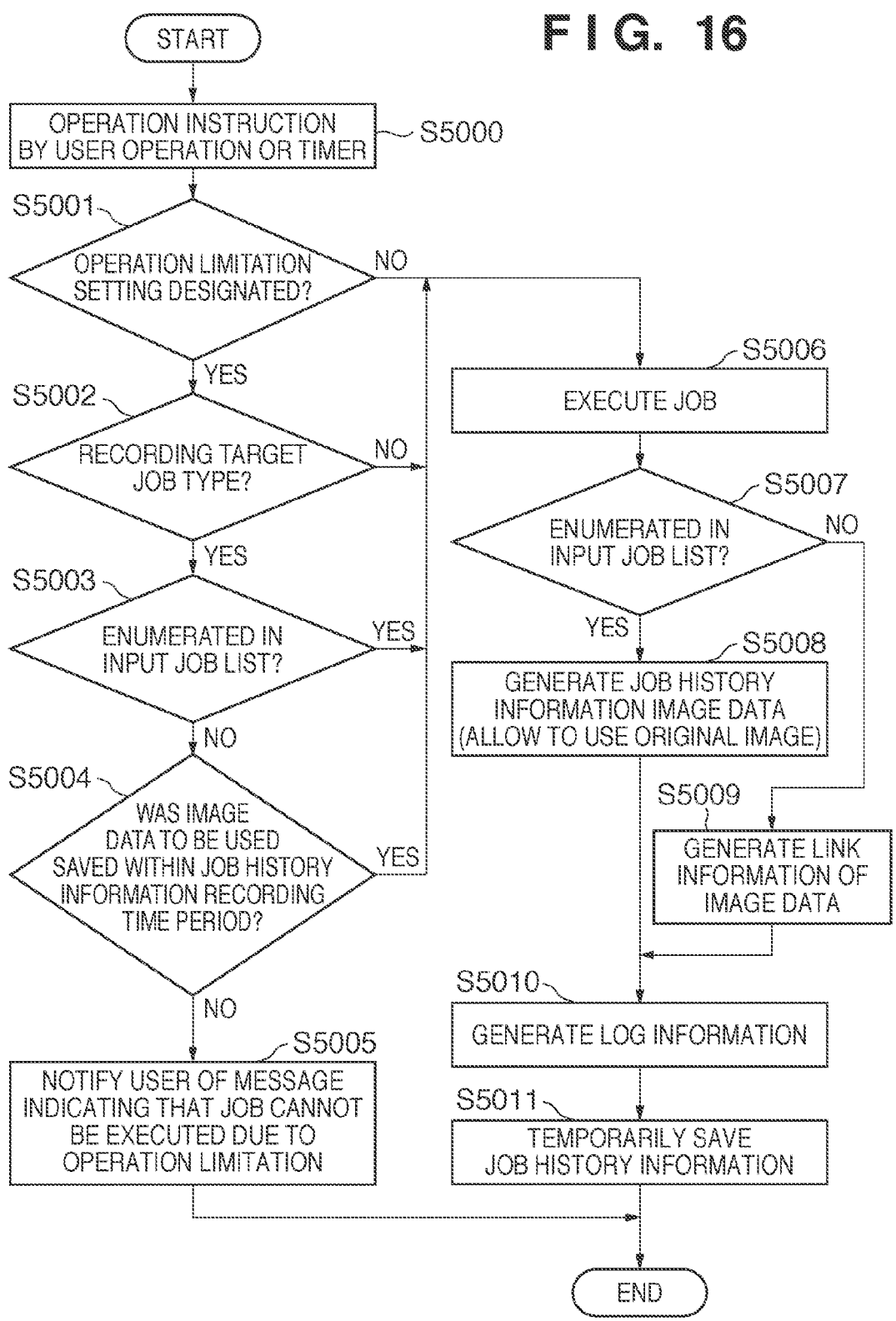
FIG. 16 is a flowchart showing job execution processing of the digital MFP according to the fourth embodiment.

FIG. 16 is a flowchart showing job execution processing in the digital MFP 10 according to this embodiment. Since the process in step S5000 is the same as that in step S3000 in FIG. 14, a description thereof will not be repeated.

A job history information control unit 304 determines in step S5001 if an operation limitation setting has been designated in step S4003 in FIG. 15. If the operation limitation setting has been designated, the process advances to step S5002; otherwise, a job is executed in step S5006. The job history information control unit 304 determines in step S5002 if a job to be executed has a job type as a job history information recording target. The contents of this process are the same as those in step S3002 in FIG. 14. If the job to be executed has the job type as the job history information recording target, the process advances to step S5003; otherwise, the job is executed in step S5006. The job history information control unit 304 determines in step S5003 whether or not the job designated in step S5000 is an input job. The contents of the process are the same as those in step S3003 in FIG. 14. If the designated job is not an input job, the process advances to step S5004; otherwise, the job is executed in step S5006. The job history information control unit 304 determines in step S5004 whether or not image data used by an output job to be executed was saved in a job history information recording time period. This determination process is attained by comparing a date and time of generation of image data with a time designated in step S4002 in FIG. 15. If the image data was not saved in the job history information recording time period, the process advances to step S5005. If the image data was saved in the job history information recording time period, the job is executed in step S5006.

In step S5005, the job history information control unit 304 notifies the user of a message indicating that the job cannot be executed due to the operation limitation via a main control unit 300 and UI control unit 301. Since the job execution process in step S5006 is the same as that in step S3001 in FIG. 14, a description thereof will not be repeated. The job history information control unit 304 determines in step S5007 if the executed job is an input job or output job. Since details of this process are the same as those in step S3003 in FIG. 14, a description thereof will not be repeated. If the executed job is enumerated in an input job list, the process advances to step S5008. If the executed job is not enumerated in the input job list, the process advances to step S5009. Step S5008 corresponds to a case in which the executed job is an input job, and the contents of the process are the same as those in step S3004 in FIG. 14. Step S5009 corresponds to a case in which the executed job is an output job, and the contents of the process are the same as those in step S3006 in FIG. 14. Since processes in steps S5010 and S5011 are the same as those in steps S3007 and S3008 in FIG. 14, a description thereof will not be repeated.

FIG. 17 shows an example of a setting screen associated with job history information in the digital MFP 10 according to the first to fourth embodiments. This embodiment uses this screen as an accepting unit, which accepts settings from the user. In step S100 in FIG. 9, the user designates job types in a "type of job to store" item 1701. For example, job types are classified into copy, print, FAX sending, FAX receiving, box, and scan/sending job types. The user designates types of jobs for which job history information is to be recorded. In step S102 in FIG. 9, the user designates job history information recording dates and times in a "day of week and time period to store" item 1702. The user designates whether job history information is recorded in full times on respective days of the week or during only designated time periods. When the user selects only designated time periods, he or she inputs job history information recording time periods using a "time period designation" item 1703. In step S103 in FIG. 9, the user designates a job history information sending schedule using a "job sending schedule" item 1704. In this screen example, the user designates a sending interval (minutes), or a sending start time. In step S104 in FIG. 9, the user designates an operating condition setting check schedule using an "operating condition setting check schedule" item 1705. In this setting screen example, the user designates a sending interval (minutes) or a sending start time as in designation of the sending schedule. In step S4003 in FIG. 15, the user designates an operation limitation setting using a "job execution in job history information recording stop time period" item 1706. The user designates whether or not to prohibit job execution. When the user designates to prohibit job execution, execution of an output job using image data of an input job executed during the job history information recording stop time period and all jobs to be executed during job history information recording stop time period is prohibited.

With the aforementioned processing, log inconsistency can be prevented from occurring while attaining a network load reduction. In addition, the security required to prevent any information leakage can be enhanced.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2009-181968, filed Aug. 4, 2009, which is hereby incorporated by reference herein in its entirety.

What is claimed is:

1. A job history information auditing system including an image forming apparatus which generates job history information including a log and image data or a link log upon execution of a job, and a data server which saves the job history information in a searchable state, said image forming apparatus comprises:
a setting information acquisition unit configured to acquire an operating condition setting associated with execution of a job and generation of a log;
a job determination unit configured to determine whether or not the executed job is an input job that has the log of the input job and image data related to the log referred to as a reference destination of the link log included in job history information of the output job which is executed after the input job has been executed, according to a type of the executed job;
an appending unit configured to append, to the image data related to the log, information indicating whether or not job history information image data has already been generated;
a generation determination unit configured to determine based on the information appended by said appending unit whether or not job history information image data has already been generated;
an image data generation unit configured to generate the image data related to the log of the executed job as job history information image data;
a log generation unit configured to generate a log or a link log of the executed job; and
a sending unit configured to send the job history information including the log and the job history information image data related to the log or the link log to said data server according to the operating condition setting, the link log includes information as a reference inclusion of the image data when the job uses the job history information image data saved in said data server, and said image data generation unit generates the job history information image data when said job determination unit determines that the executed job is the input job, and said generation determination unit determines that the job history information image data has not been generated yet.

2. The system according to claim 1, wherein the information appended by said appending unit is date information including a date and time of generation and a date and time of updating, and the date information is updated when said image data generation unit generates the job history information image data, said generation determination unit comprises:

a date information acquisition unit configured to acquire the date and time of generation and the date and time of updating of the image data; and a date information comparing unit configured to compare the date and time of generation and the date and time of updating of the image data, and when the date and time of generation matches the date and time of updating as a result of comparison by said date information comparing unit, said image data generation unit determines that the job history information image data has not been generated yet, and generates the job history information image data.

3. The system according to claim 1, wherein the information appended by said appending unit is a flag associated with generation, said generation determination unit determines based on the flag whether or not the job history information image data has been generated, and when said generation determination unit determines that the job history information image data has not been generated yet, said image generation unit generates the job history information image data, and updates the flag.

4. The system according to claim 1, wherein when said job determination unit determines that the executed job is a job, image data of which is likely to be linked as a reference destination by a link log of another job, even when the job was executed during a job history information recording stop time period, said image data generation unit and said log generation unit generate a log of the executed job and the job history information image data related to the log.

5. The system according to claim 1, wherein said setting information acquisition unit further acquires a limitation setting associated with job execution when the log fails to be acquired, and when the limitation setting associated with job execution designates prohibition of job execution when the log fails to be acquired, the job execution is prohibited, and a user is notified of a job execution prohibition message.

6. The system according to claim 1, wherein the operating condition setting includes at least one of a setting of a type of a job stored as the job history information image data, a setting of a job history information recording time period, and a limitation setting associated with job execution.

7. An image forming apparatus, which generates job history information including a log and image data or a link log upon execution of a job, and is connected to a data server, which saves the job history information in a searchable state, comprising:

a setting information acquisition unit configured to acquire an operating condition setting associated with execution of a job and generation of a log;

a job determination unit configured to determine whether or not the executed job is an input job that has the log of the input job and image data related to the log referred to as a reference destination of the link log included in job history information of the output job which is executed after the input job has been executed, according to a type of the executed job;

an appending unit configured to append, to the image data related to the log, information indicating whether or not job history information image data has already been generated;

a generation determination unit configured to determine based on the information appended by said appending unit whether or not job history information image data has already been generated;

an image data generation unit configured to generate the image data related to the log of the executed job as job history information image data;

a log generation unit configured to generate a log or a link log of the executed job; and a sending unit configured to send the job history information including the log and the job history information image data related to the log or the link log to the data server according to the operating condition setting, wherein the link log includes information as a reference destination of the image data when the job uses the job history information image data saved in the data server, and said image data generation unit generates the job history information image data when said job determination unit determines that the executed job is the input job, and said generation determination unit determines that the job history information image data has not been generated yet.

8. A control method of a job history information auditing system including an image forming apparatus which generates job history information including a log and image data or a link log upon execution of a job, and a data server which saves the job history information in a searchable state, the method comprising:

controlling the image forming apparatus to execute a setting information acquisition step of controlling a setting information acquisition unit of the image forming apparatus to acquire an operating condition setting associated with execution of a job and generation of a log, a job determination step of controlling a job determination unit of the image forming apparatus to determine whether or not the executed job is an input job that has the log of the input job and image data related to the log referred to as a reference destination of the link log included in job history information of the output job which is executed after the input job has been executed, according to a type of the executed job, an appending step of controlling an appending unit of the image forming apparatus to append, to the image data related to the log, information indicating whether or not job history information image data has already been generated, a generation determination step of controlling a generation determination unit of the image forming apparatus to determine based on the information appended in the appending step whether or not job history information image data has already been generated, an image data generation step of controlling an image data generation unit of the image forming apparatus to generate the image data related to the log of the executed job as job history information image data, a log generation step of controlling a log generation unit of the image forming apparatus to generate a log or a link log of the executed job, and a sending step of controlling a sending unit of the image forming apparatus to send the job history information including the log and the job history information image data related to the log or the link log to the data server according to the operating condition setting, wherein the link log includes information as a reference destination of the image data when the job uses the job history information image data saved in the data server, and in the image data generation step, the job history information image data is generated when it is determined in the job determination step that the executed job is the input job, and it is determined in the generation determination step that the job history information image data has not been generated yet.

9. A non-transitory computer-readable medium storing a program making an image forming apparatus function as:

a setting information acquisition unit configured to acquire an operating condition setting;

a job determination unit configured to determine whether or not an executed job is an input job that has the log of the input job and image data related to the log referred to as a reference destination of a link log included in job history information of the output job which is executed after the input job has been executed, according to a type of the executed job;

an appending unit configured to append, to the image data related to the log, information indicating whether or not job history information image data has already been generated;

a generation determination unit configured to determine based on the information appended by said appending unit whether or not job history information image data has already been generated;

an image data generation unit configured to generate the image data related to the log of the executed job as job history information image data;

a log generation unit configured to generate a log or a link log of the executed job; and a sending unit configured to send the job history information including the log and the job history information image data related to the log or the link log to a data server according to the operating condition setting, wherein the link log includes information as a reference destination of the image data when the job uses the job history information image data saved in the data server, and said image data generation unit generates the job history information image data when said job determination unit determines that the executed job is the input job, and said generation determination unit determines that the job history information image data has not been generated yet.

* * * * *